(No Model.) 2 Sheets—Sheet 1.
J. LOCKE.
ART OR METHOD OF INDENTING CONVEX OR SPHERICAL SURFACES OF GLASS AND MACHINE FOR PRODUCING THE SAME.
No. 283,625. Patented Aug. 21, 1883.
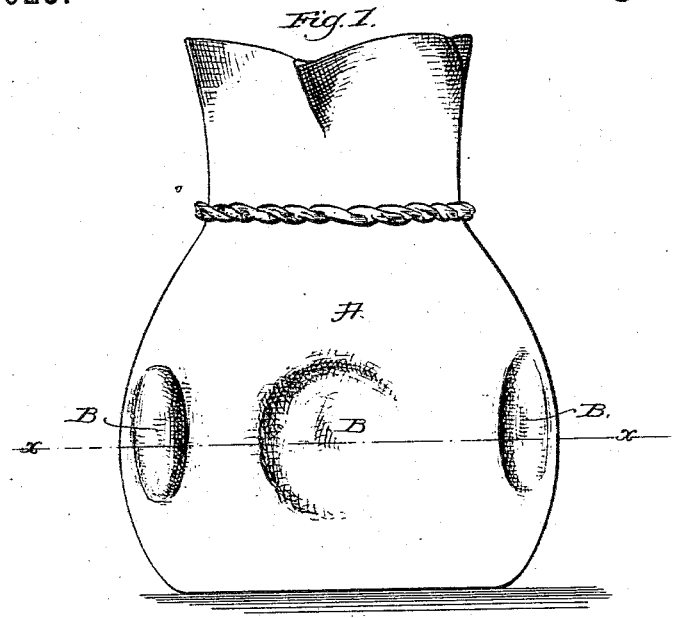
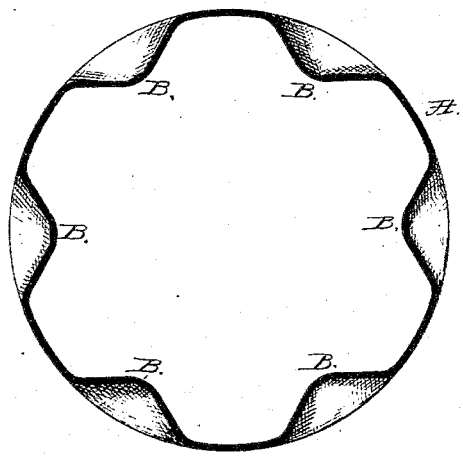

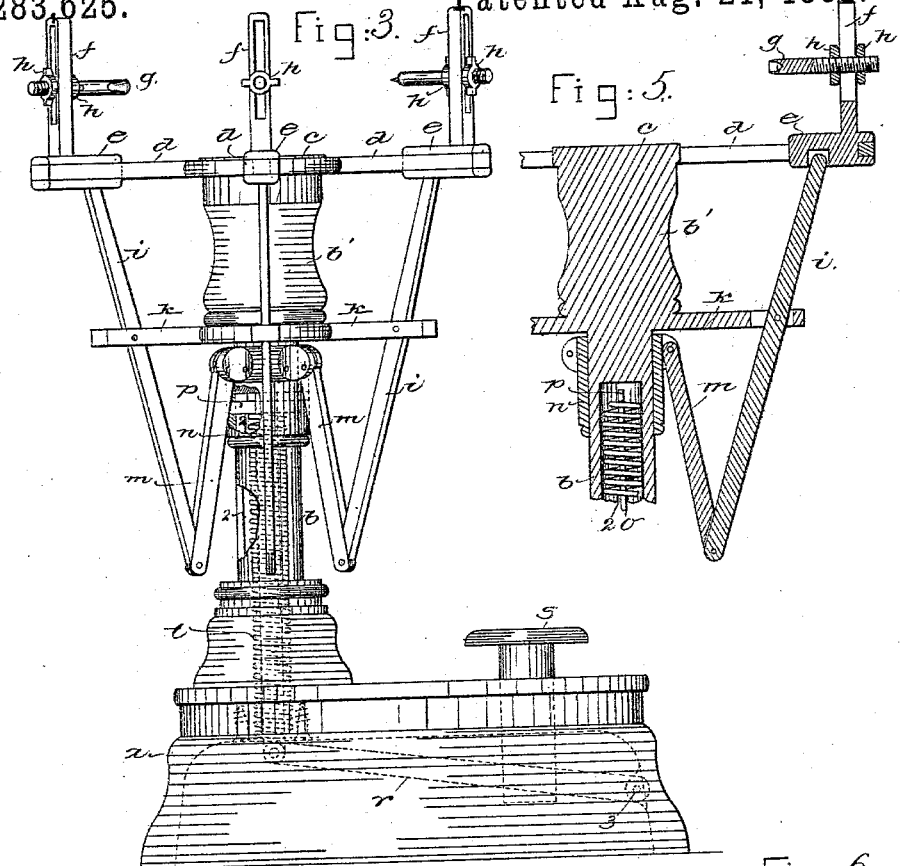

UNITED STATES PATENT OFFICE.

JOSEPH LOCKE, OF SOMERVILLE, ASSIGNOR TO WILLIAM L. LIBBEY, OF NEWTON, AND EDWARD D. LIBBEY, OF BOSTON, MASSACHUSETTS.

ART OR METHOD OF INDENTING CONVEX OR SPHERICAL SURFACES OF GLASS, AND MACHINE FOR PRODUCING THE SAME.

SPECIFICATION forming part of Letters Patent No. 283,625, dated August 21, 1883.

Application filed June 25, 1883. (No model.)

*To all whom it may concern:*

Be it known that I, JOSEPH LOCKE, of Somerville, county of Middlesex, State of Massachusetts, have invented an Improvement in the Art or Method of Indenting Convex or Spherical Surfaces of Glass, and Machine for Producing the Same, of which the following description, in connection with the accompanying drawings, is a specification, like letters on the drawings representing like parts.

This invention has for its object to indent or press inward convex or spherical surfaces of glassware, to thereby ornament the same or change its shape, so that a cross-section of the article cutting the same where pressed back will have a series of re-entering curves or angles similar to a musk-melon.

My invention may be practiced to advantage in the manufacture of bottles, flower-vases, pitchers, and other articles of thin glass by means of a machine by which each article of glassware may be quickly indented or pressed inward substantially simultaneously from various points at its circumference, the depression produced having a definite position upon the article, enabling a series of similar articles to be uniformly indented and shaped.

The apparatus consists, essentially, of a stand or platform to hold the article to be operated upon, and having a series of guides around the said platform provided with carriages adapted to hold the pushers or indenting-tools in any desired position with relation to the platform, the entire series of carriages being operated simultaneously, or substantially so, by actuating mechanism consisting, as herein shown, of a series of levers and links connected with a single reciprocating head or collar acted upon by a spring tending to move it in the direction to withdraw the tools, the collar having connected with it a suitable handle or treadle to enable it to be actuated by the operator.

Figure 1 represents in elevation a jar made in accordance with my invention; Fig. 2, a cross-section of the same on the dotted line $x$ $x$. Fig. 3 is a side elevation of an apparatus for ornamenting glassware in accordance with this invention; Fig. 4, a plan view thereof; Fig. 5, a partial vertical section, and Figs. 6 to 11 details showing various forms of pushers or indenting-tools that may be employed.

The base $a$ of the machine employed for indenting articles in accordance with my invention is provided with an upright or standard, $b\ b'$, surmounted by the platform $c$, upon which the articles to be operated upon are placed. The upper portion, $b'$, of the said standard is provided with a series of radial guide-arms, $d$, surrounding the said platform $c$, and provided with carriages $e$, having uprights $f$, in which are supported the pushers or indenting devices $g$—one or more in each carriage—which are to act upon and indent the convex surface of the article being made. The said uprights $f$ are slotted, and the shanks of the tools $g$ are shown as screw-threaded, and provided with nuts $h$ to engage the sides of the said uprights, thus enabling the vertical position of the tools with relation to the platform $c$ and articles supported thereon to be adjusted as desired, and also enabling the distance that the acting end of the tool projects from the upright toward the platform to be adjusted to regulate the depth and position of the indentations, and to adapt the apparatus to articles of different size.

The carriages $e$ are all operated simultaneously by levers $i$, pivoted in arms $k$, projecting from the standard $b\ b'$, and connected at their lower ends, by bars $m$, with a collar, $n$, having a sliding movement on the standard $b$, which serves as a guide for it. The said standard $b$ is made hollow or tubular, and is provided with a longitudinal slot, 2, and the said standard contains within it a rod, $o$, connected with the collar $n$ by a pin, $p$, passing through the slot 2 in the standard $b$. The said rod $o$ is connected at its lower end with a lever, $r$, (shown in dotted lines, Fig. 3,) pivoted at 3 in the base $a$ of the machine, and operated by a push knob or handle, $s$, to depress the said lever and connected collar $n$ to move the toggle-levers $m\ i$, and thus cause all the carriages $e$ and pushers $g$, mounted thereon, to move simultaneously toward the platform $c$. A spring, $t$, acting upon the pin $p$, tends to raise the collar $n$, and thus retract the pushers $g$ or throw them to their extreme outward position, as shown in the drawings.

To produce an article, A, of glassware in accordance with my invention, a sufficient quantity of glass gathered upon the blow-rod or punty is removed from the pot, blown, or blown and molded to form the body or spherical or hollow part of the article, which, while its body is yet hot and plastic, is placed upon the support $c$, between the series of pushers $g$, and the latter are moved forward, acting simultaneously, or nearly so, upon the article at opposing points, properly centering it upon the platform and causing the convexed or spherical sides to be pushed back or in toward the center of the article, as shown at B, Fig. 2.

By placing the acting ends of the pushers $g$ in a circle and giving to them equal movement the extreme outer portion of the article, not moved inward by the pushers, will remain substantially in the position originally occupied thereby; but, if desired, the pushers may be arranged to indent the article at different depths, and may make such deep impressions as to materially change the shape of the article.

The pushers $g$, which are herein shown as six in number, may be of any desired shape to produce different designs at the innermost points of the indentations, and the apparatus might be constructed to operate any desired number of the said pushers. Various different forms of the said pushers are shown in Figs. 4 to 9, and it is obvious that two or more of the said pushers may be mounted in any one or more of the carriages $f$, if desired.

Cylindrical articles of glassware previous to this invention have been crimped or fluted at their ends or along an edge; but by the present invention the surface of the article is acted upon between its ends, thus producing effects not attained by previous methods.

As herein provided for, the pushers indent the article at points having a definite relation to one another and established mechanically, enabling the uniform production of any number of articles of a given kind, which could not be done if the indentations were made singly by hand, and making the indentations simultaneously, or at the same heat, makes the production more rapid than were each indentation made at a separate heat, as would be necessary if the article were indented by hand.

I claim—

1. That improvement in the art or method of shaping or ornamenting convexed or spherical surfaces of glassware which consists in simultaneously pushing inward or indenting the said surface at various predetermined points, substantially as described.

2. In a machine for indenting the surface of articles of glassware, a stand or platform to support the article, combined with one or more movable carriages provided each with a pusher to indent or push inward the convex or spherical surface of the article being acted upon, substantially as described.

3. In a machine for indenting convexed or spherical surfaces of articles of glassware, a stand or platform, combined with a series of movable carriages, actuating mechanism therefor, and with pushers made adjustable on the said carriages, substantially as described.

In testimony whereof I have signed my name to this specification in the presence of two subscribing witnesses.

JOSEPH LOCKE.

Witnesses:
G. W. GREGORY,
B. J. NOYES.